(12) United States Patent
Matsui

(10) Patent No.: US 11,521,403 B2
(45) Date of Patent: Dec. 6, 2022

(54) IMAGE PROCESSING DEVICE FOR A READ IMAGE OF AN ORIGINAL

(71) Applicant: KYOCERA Document Solutions Inc., Osaka (JP)

(72) Inventor: Naoki Matsui, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/208,121

(22) Filed: Mar. 22, 2021

(65) Prior Publication Data

US 2021/0303837 A1  Sep. 30, 2021

(30) Foreign Application Priority Data

Mar. 24, 2020 (JP) .............................. JP2020-053462

(51) Int. Cl.
*G06V 30/412* (2022.01)
*G06V 10/26* (2022.01)
*G06V 30/414* (2022.01)

(52) U.S. Cl.
CPC ............ *G06V 30/412* (2022.01); *G06V 10/26* (2022.01); *G06V 30/414* (2022.01)

(58) Field of Classification Search
CPC .... G06V 30/412; G06V 10/26; G06V 30/414; G06V 30/10
See application file for complete search history.

(56) References Cited

U.S. PATENT DOCUMENTS

| 6,870,549 | B1 * | 3/2005 | Swann | G06T 7/11 382/173 |
|---|---|---|---|---|
| 11,334,913 | B1 * | 5/2022 | Mohamad | H04W 4/12 |
| 2006/0158700 | A1 * | 7/2006 | Byun | H04N 1/00779 358/474 |
| 2006/0230004 | A1 * | 10/2006 | Handley | G06V 10/23 706/12 |
| 2010/0331043 | A1 * | 12/2010 | Chapman | G06Q 20/384 455/556.1 |
| 2011/0044539 | A1 * | 2/2011 | Kimura | G06V 30/414 382/176 |
| 2011/0188093 | A1 * | 8/2011 | Campbell | G06K 9/00 382/107 |

(Continued)

FOREIGN PATENT DOCUMENTS

JP   2008-160339   7/2008

*Primary Examiner* — Ming Y Hon
(74) *Attorney, Agent, or Firm* — Lex IP Meister, PLLC

(57) ABSTRACT

An image processing device includes a document image extraction unit, a business card array image detection unit, and a business card image separation unit. The document image extraction unit extracts one document image in a read image obtained by scanning one or a plurality of documents placed on a platen glass of an image reading device. When the document is a plurality of business cards arranged without gaps, the business card array image detection unit detects the document image as a business card array image in which a plurality of business card images are arranged without gaps, based on at least one of the distribution of character string objects and the distribution of character sizes in the document image. The business card image separation unit separates the detected business card array image into the plurality of business card images.

4 Claims, 5 Drawing Sheets

(56) References Cited

U.S. PATENT DOCUMENTS

| | | | |
|---|---|---|---|
| 2016/0092730 A1* | 3/2016 | Smirnov | G06V 30/414 |
| | | | 382/195 |
| 2016/0210768 A1* | 7/2016 | Yoo | G06T 3/40 |
| 2017/0155792 A1* | 6/2017 | Mizude | H04N 1/00748 |
| 2019/0191038 A1* | 6/2019 | Naito | H04N 1/4406 |
| 2021/0406211 A1* | 12/2021 | Maeda | G06F 13/385 |
| 2022/0132276 A1* | 4/2022 | Choi | H04L 67/02 |

* cited by examiner

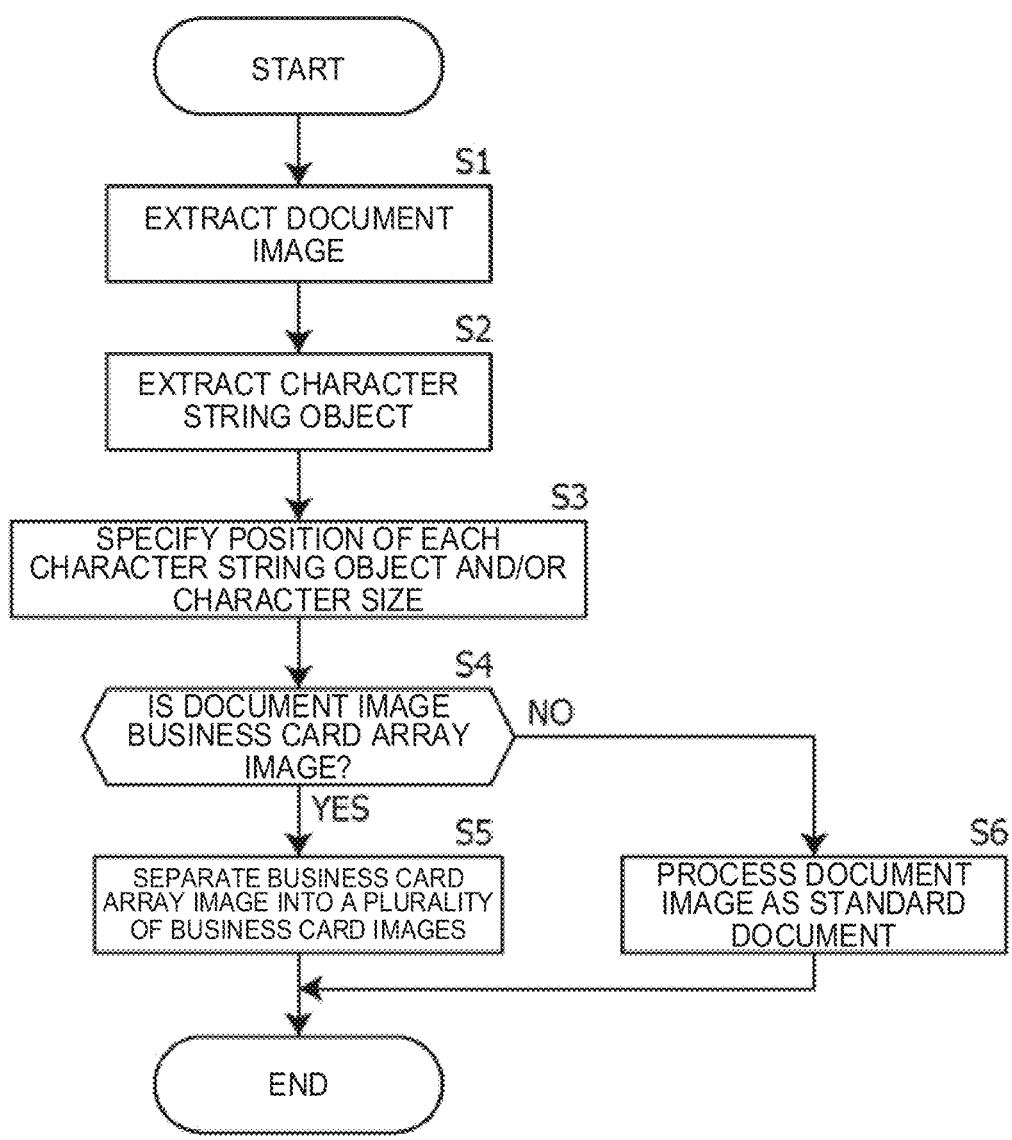

IMAGE PROCESSING DEVICE FOR A READ IMAGE OF AN ORIGINAL

INCORPORATION BY REFERENCE

This application is based upon and claims the benefit of priority from the corresponding Japanese Patent Application No. 2020-053462 filed on Mar. 24, 2020, the entire contents of which are incorporated herein by reference.

BACKGROUND

The present disclosure relates to an image processing device.

An image processing device extracts each document image from a single read image obtained by collectively scanning a plurality of documents placed unaligned on a platen glass, and arranges the extracted document images to print as a single image.

SUMMARY

An image processing device according to the present disclosure includes a document image extraction unit, a business card array image detection unit, and a business card image separation unit. The document image extraction unit extracts one document image in a read image obtained by scanning one or a plurality of documents placed on a platen glass of an image reading device. When the document is a plurality of business cards arranged without gaps, the business card array image detection unit detects the document image as a business card array image in which a plurality of business card images are arranged without gaps, based on at least one of the distribution of character string objects and the distribution of character sizes in the document image. The business card image separation unit separates the detected business card array image into the plurality of business card images.

BRIEF DESCRIPTION OF THE DRAWINGS

FIG. 5 is a flow chart for explaining the operation of the image processing device 14 in FIG. 1. FIG. 5 is a flow chart for explaining the operation of the image processing device 14 in FIG. 1.

DETAILED DESCRIPTION

In the following, embodiments of the present disclosure will be described with reference to the drawings.

Figure 1:
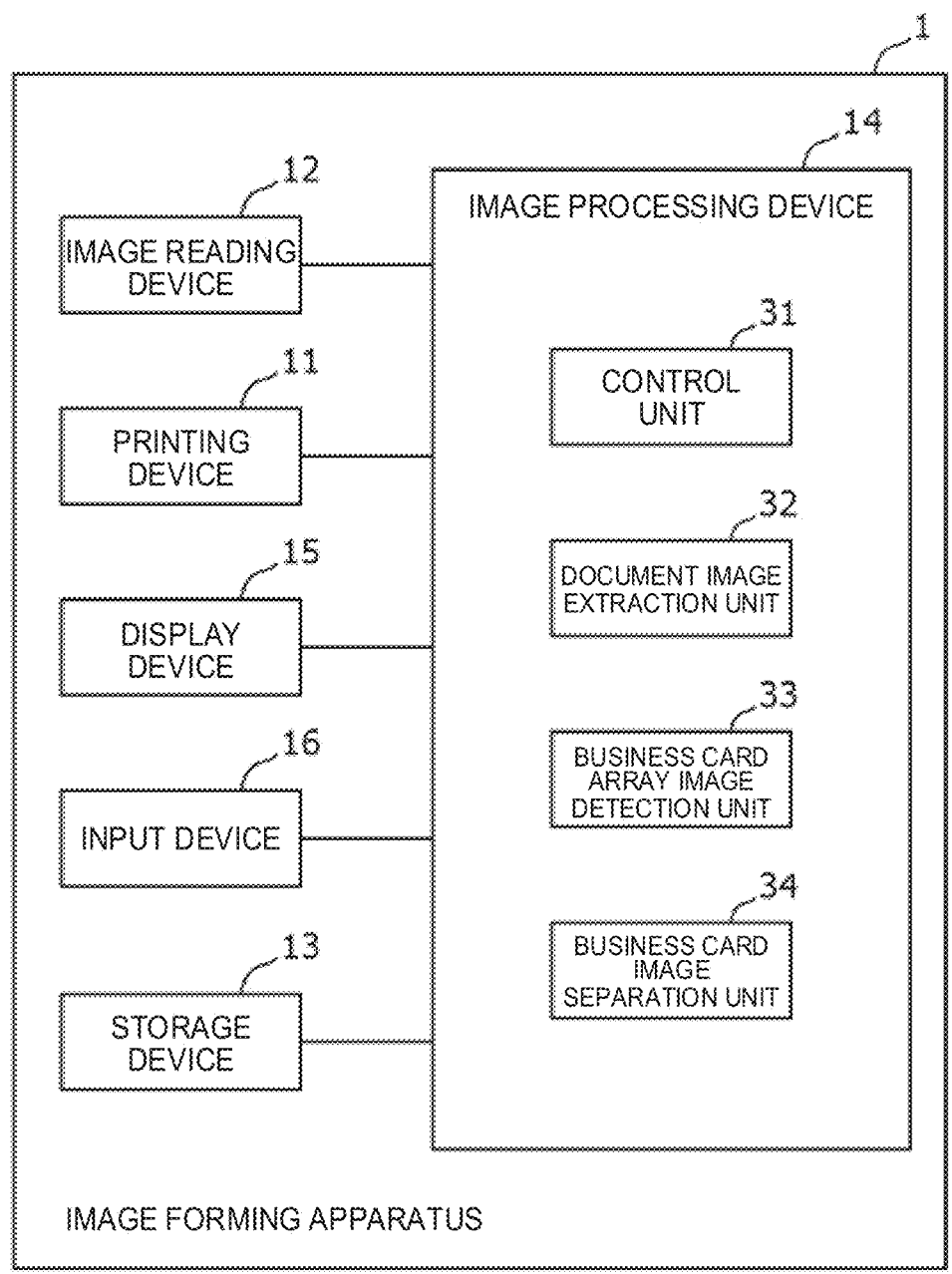
FIG. 1 is a block diagram showing a configuration example of an image forming apparatus including an image processing device 14 according to an embodiment of the present disclosure.

FIG. 1 is a block diagram showing a configuration example of an image forming apparatus including an image processing device according to an embodiment of the present disclosure. The image forming apparatus 1 shown in FIG. 1 is a copying machine, but may be a scanner, a multifunction machine, or the like.

The image forming apparatus 1 includes a printing device 11, an image reading device 12, a storage device 13, an image processing device 14, a display device 15, and an input device 16.

The printing device 11 is an internal device for printing a document image by an electrophotographic process using, for example, CMYK (Cyan, Magenta, Yellow, and Black) toner based on image data after various image processing by the image processing device 14.

The image reading device 12 is an internal device provided with a platen glass, optically reads one or a plurality of documents placed on the platen glass, and generates image data of a read image of a predetermined size as, for example, RGB data.

The storage device 13 is a rewritable nonvolatile storage device such as a flash memory, and stores various data and programs.

The image processing device 14 performs various image processing on the image data generated by the image reading device 12 or the like.

The image processing device 14 includes an ASIC (Application Specific Integrated Circuit) and a computer operating according to a program, and operates the ASIC and the computer as a control unit 31, a document image extraction unit 32, a business card array image detection unit 33, and a business card image separation unit 34. Accordingly, the image processing device 14 includes the control unit 31, the document image extraction unit 32, the business card array image detection unit 33, and the business card image separation unit 34.

The control unit 31 controls an internal device such as the image reading device 12, causes the image reading device 12 to read the read image, acquires image data of the read image (page image of a predetermined size) from the image reading device 12, and performs image processing on the read image together with the document image extraction unit 32, the business card array image detection unit 33, and the business card image separation unit 34.

The document image extraction unit 32 extracts one document image in the acquired read image.

Here, the read image includes an object corresponding to the document, and the background of the read image is white. For example, in the read image, the document image extraction unit 32 selects a target line one by one or every predetermined line(s) in order, searches for the edge of the rectangular object for each target line, and detects the edge of the rectangular object on the target line based on the density change (for example, the change of the luminance value) of each pixel in the target line. The document image extraction unit 32 detects a rectangular object as a document image based on the detected edge.

Figure 2:
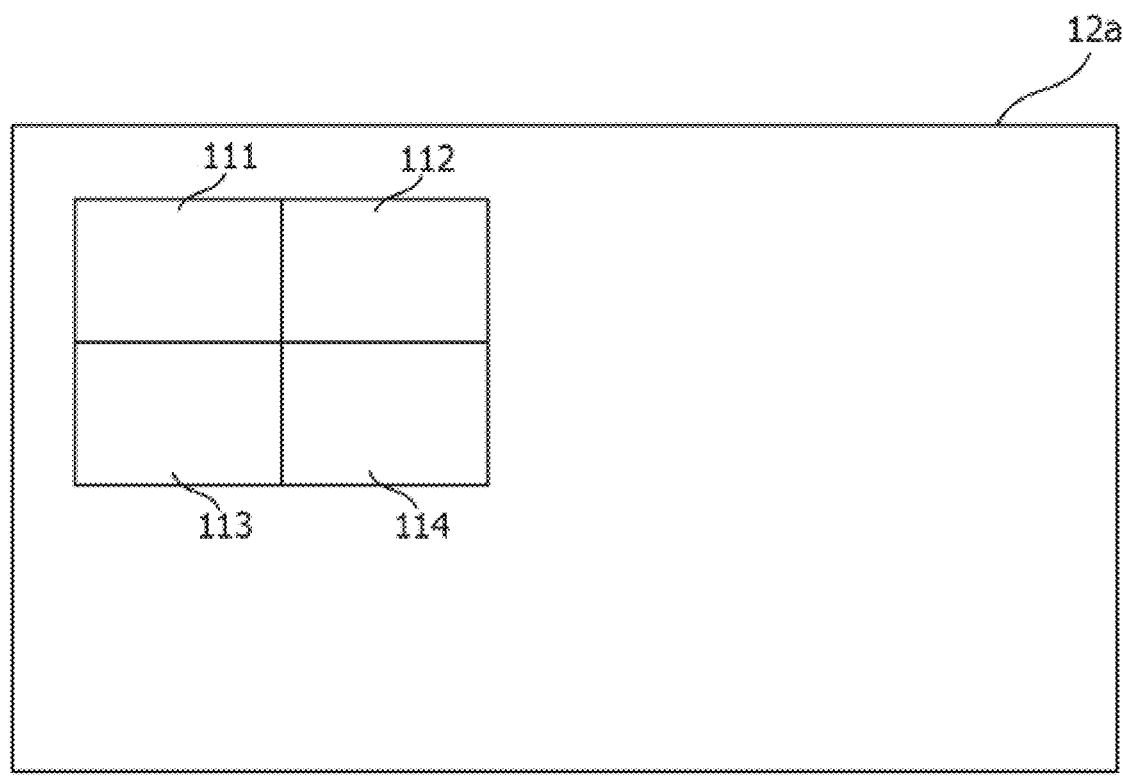
FIG. 2 is a diagram showing an example of a plurality of business cards 111 to 114 placed on a platen glass 12a of an image reading device 12 in FIG. 1.
Figure 3:
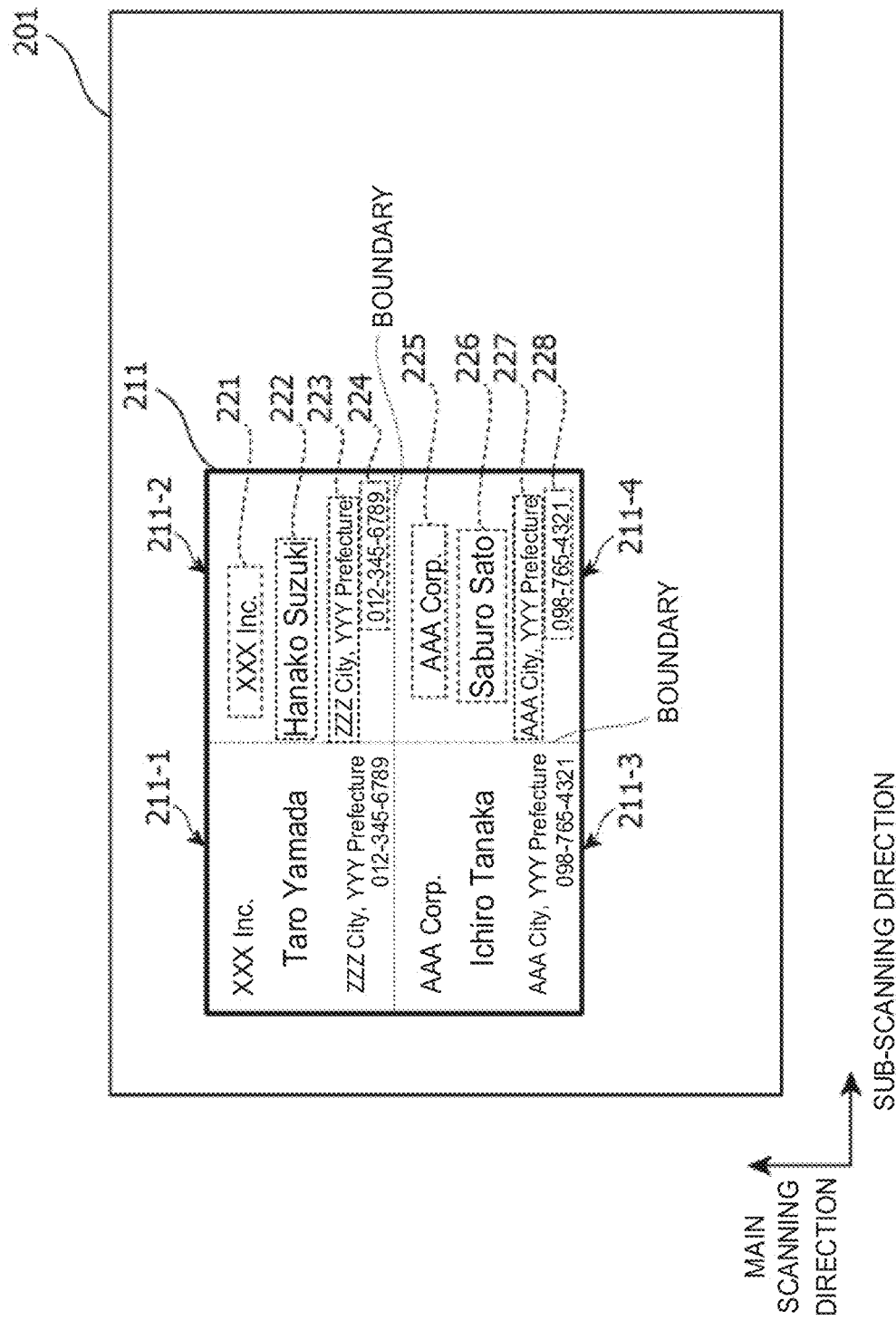
FIG. 3 is a diagram showing an example of a read image including a document image (business card array image) corresponding to the document (a plurality of business cards 111 to 114) shown in FIG. 2.

FIG. 2 is a diagram showing an example of a plurality of business cards 111 to 114 placed on the platen glass 12a of the image reading device 12 in FIG. 1. FIG. 3 is a diagram showing an example of a read image including a document image (business card array image) corresponding to the document (a plurality of business cards 111 to 114) shown in FIG. 2. For example, in a case where a plurality of business cards 111 to 114 are arranged without gaps as shown in FIG. 2 and have a rectangular shape as a whole, one document image 211 having a rectangular shape is included in the read image 201, for example as shown in FIG. 3.

When the document is a plurality of business cards arranged without gaps, the business card array image detection unit 33 detects the document image as a business card array image in which a plurality of business card images are arranged without gaps, based on at least one of the distribution of the character string objects 221 to 228 and the distribution of the character size in the document image.

The business card array image detection unit 33 specifies the distribution of the character string objects 221 to 228 in the document image (that is, the distribution of the positions of the character string objects) and/or the distribution of the character sizes of the character string objects 221 to 228 in the document image.

With regard to the distribution of the character string objects 221 to 228, the business card array image detection unit 33 specifies, as two target character string objects, character string objects on both sides of a boundary of a plurality of regions obtained by dividing the document image into 1/integer (for example, ½ to ¼) of a predetermined range in one of a main scanning direction and a sub-scanning direction of the document image (here, the main scanning direction), and detects the document image as a business card array image when there is no character string object on the boundary and the interval between the target character string objects is larger than a predetermined value.

In this case, if the interval between the target character string objects is larger than the interval (that is, the aforementioned predetermined value) between one of the target character string objects and another character string object adjacent to the one of the target character string objects (that is, a character string object that is not the target character string object), the business card array image detection unit 33 may detect the document image as the business card array image.

For example, in the case shown in FIG. 3, the character string objects 224 and 225 on both sides of the boundary of the plurality of regions obtained by dividing the document image into half are specified as the target character string objects. Then, since the interval between the character string objects 224 and 225 (target character string objects) is larger than a predetermined value (here, the interval between the character string objects 223 and 224 and/or the interval between the character string objects 225 and 226), the document image is detected as a business card array image.

Further, the business card array image detection unit 33 may detect the document image as the business card array image when a plurality of regions obtained by dividing the document image into 1/integer respectively have one character size peak in the distribution of the character size in one of the main scanning direction and the sub-scanning direction of the document image. That is, as described above, even if the interval between the target character string objects is not larger than the predetermined value, when each of the plurality of areas has one character size peak, the business card array image detection unit 33 may detect the document image as the business card array image. Alternatively, an arrangement is possible in which, even if the interval between the target character string objects is larger than the predetermined value, the business card array image detection unit 33 does not detect the document image as the business card array image when each of the plurality of areas does not have one character size peak.

Figure 4:
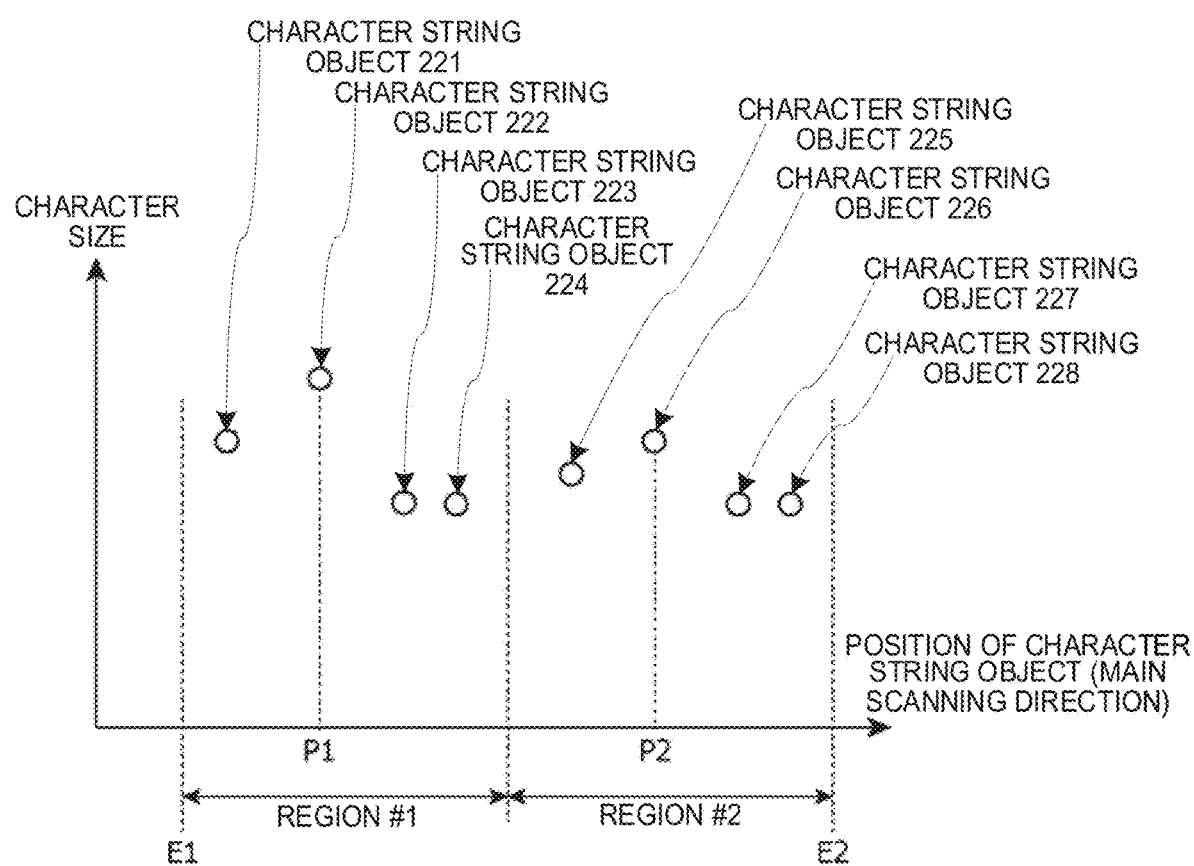
FIG. 4 is a diagram showing an example of the distribution of character sizes corresponding to the document image shown in FIG. 3.

FIG. 4 is a diagram showing an example of the distribution of character sizes corresponding to the document image shown in FIG. 3. Generally, the size of characters used in a business card is not uniform, but the largest character is used for the most important part (name, etc.), and such part is arranged in the center of the business card, so that the distribution of character sizes has one character size peak for each region of the business card (business card image). In the case of FIG. 4, the two regions #1 and #2 between the edge positions E1 and E2 at both ends in the main scanning direction have peaks at the positions P1 and P2, respectively.

The business card image separation unit 34 separates the detected business card array image into a plurality of business card images corresponding to the plurality of business cards as the original document. For example, the business card image separation unit 34 (a) specifies the vertical size and horizontal size of the document image, (b) increases the coefficient (integer) K in the vertical direction of the document image, compares the product (91 mm×K and 55 mm×K) obtained by multiplying the coefficient by the size of the sides (about 91 mm and about 55 mm) of the standard size (about 91 mm×about 55 mm) of the business card with the vertical size of the document image, and if the difference between the two is within a predetermined error, determines that K is the number of business card images in the vertical direction of the document image, and (c) specifies the number of business card images in the horizontal direction of the document image in the same manner as in the vertical direction.

Alternatively, the number of business card images 211-1 to 211-4 included in the business card array image in the main scanning direction and the sub-scanning direction may be specified based on the number of boundaries and the number of peaks described above. For example, if the number of the above-described peaks (maximum values) in a certain direction is two, it is determined that the number of business card images in the certain direction is two. If the number of the above-described boundaries in a certain direction is 1, it is determined that the number of business card images in the certain direction is two.

Next, the operation of the image processing device 14 will be described. FIG. 5 is a flow chart for explaining the operation of the image processing device 14 in FIG. 1.

When the control unit 31 acquires the read image, the document image extraction unit 32 extracts the document image in the read image (step S1).

Next, the document image extraction unit 32 extracts a character string object in the document image (step S2).

At this time, first, the document image extraction unit 32 specifies an object in the document image, executes a character recognition process on the object, and specifies an object composed of one or a plurality of characters as a character string object. At this time, the document image extraction unit 32 detects a character string object in the document image because it does not use any dictionary or pre-registered phrase, but does not specify the meaning of the character string object detected in the document image.

Further, the business card array image detection unit 33 specifies the position and character size of each character string object in the document image, and specifies the distribution of the character string object and/or the distribution of the character size in the document image (step S3). At this time, the above-described distribution in the direction (main scanning direction or sub-scanning direction) perpendicular to the direction (that is, the arrangement direction of characters in the character string object; the main scan direction or the sub-scanning direction) of the character string object is specified. The above-described distribution is specified at the position where the largest number of character objects are detected in the direction (i.e., the position in the main scanning direction or the sub-scanning direction which is the direction of the character string object).

Then, the business card array image detection unit 33 determines whether or not the document image is a business card array image based on the distribution of the character string object and/or the distribution of the character size as described above (step S4).

If it is determined that the document image is a business card array image, the business card image separation unit 34 separates the detected business card array image into a plurality of business card images corresponding to the plurality of business cards as the aforementioned document (step S5). Thereafter, for the plurality of business card images, the control unit 31 executes a predetermined process specific to the business card image (for example, detection of business card information (company name, name, address, telephone number, etc.) from each business card image, printing of the business card image, etc.).

On the other hand, if it is determined that the document image is not a business card array image, the control unit 31 regards the document image as a document image of a standard document other than a business card (that is, a document image of a standard document whose size is closest to the document image) and executes a predetermined process (step S6).

As described above, according to the above embodiment, the document image extraction unit 32 extracts one document image in the read image, and, when the document is a plurality of business cards arranged without gaps, the business card array image detection unit 33 detects the document image as a business card array image in which a plurality of business card images are arranged without gaps, based on at least one of the distribution of the character string object and the distribution of the character size in the document image. The business card image separation unit 34 separates the detected business card array image into a plurality of business card images.

Thus, even in the case of one read image obtained by scanning a plurality of business cards placed on the platen glass without any gap, it is accurately determined that the read image includes a plurality of document images (business card images) without referring to any dictionary or pre-registered phrase.

When the image processing device 14 performs automatic recognition of the document size (that is, a process of selecting the document size from a plurality of predetermined standard sizes), the vertical and horizontal sizes of the rectangular document image 211 are specified, and it is determined that the image is a document image of a standard document (for example, a postcard) corresponding to the vertical and horizontal sizes. Therefore, when a plurality of business cards 111 to 114 are arranged without a gap and the vertical size and the horizontal size of the document image as a whole are close to the size of the standard document, if the document type of the document is specified only by the size of the document image in automatic recognition, the document type of the document may be erroneously recognized as another document type (for example, a postcard) instead of the business card. On the other hand, according to the image processing device of this embodiment, since the business card array image is detected based on the distribution of the character string object and the distribution of the character size, such erroneous recognition is suppressed.

Various changes and modifications to the foregoing embodiments will be apparent to those skilled in the art, and may be made without departing from the spirit and scope of the subject matter and without diminishing the intended benefits. That is, such changes and modifications are intended to be included in the claims.

For example, in the above-described embodiment, an arrangement is possible in which, when the number of character string objects having a character size within a predetermined range is not within a predetermined range in either the main scanning direction or the sub-scanning direction of the document image, the business card array image detection unit 33 does not detect the document image as the business card array image. In other words, an arrangement is made in which, when a large number of character string objects are present or when a large number of character objects having a character size that is not normally used for a business card are detected, the document image is not detected as a business card array image, thereby suppressing erroneous recognition of different types of documents having a business card size as business cards.

The present disclosure is applicable to an apparatus including an image reading device such as a scanner, a copying machine, a multifunction machine, or the like.

What is claimed is:

1. An image processing device comprising:
   a document image extraction unit for extracting one document image in a read image obtained by scanning one or a plurality of documents placed on a platen glass of an image reading device;
   a business card array image detection unit to detect the document image as a business card array image in which a plurality of business card images are arranged without gaps, based on at least one of a distribution of character string objects and a distribution of character sizes in the document image, when the document is a plurality of business cards arranged without gaps; and
   a business card image separating unit for separating the detected business card array image into the plurality of business card images,
   wherein the business card array image detecting unit specifies, regarding the distribution of the character string objects, the character string objects on both sides of a boundary of a plurality of regions obtained by dividing the document image into 1/integer in one of a main scanning direction and a sub-scanning direction of the document image as two target character string objects, and detects the document image as the business card array image when there is no character string object on the boundary and an interval between the target character string objects is larger than a predetermined value.

2. The image processing device according to claim 1, wherein the business card array image detecting unit detects the document image as the business card array image when the interval between the target character string objects is larger than an interval between one of the target character string objects and another character string object adjacent to the one of the target character string objects.

3. An image processing device comprising:
   a document image extraction unit for extracting one document image in a read image obtained by scanning one or a plurality of documents placed on a platen glass of an image reading device;
   a business card array image detection unit to detect the document image as a business card array image in which a plurality of business card images are arranged without gaps, based on at least one of a distribution of character string objects and a distribution of character sizes in the document image, when the document is a plurality of business cards arranged without gaps; and a business card image separating unit for separating the detected business card array image into the plurality of business card images, wherein the business card array image detection unit detects the document image as the business card array image based on the distribution of the character string object and the distribution of the character size, and the business card array image detection unit detects the document image as the business card array image when each of a plurality of regions obtained by dividing the document image into 1/integer has one peak of the character size in the distribution of the character size in one of a main scanning direction and a sub-scanning direction of the document image.

4. An image processing device comprising:

a document image extraction unit for extracting one document image in a read image obtained by scanning one or a plurality of documents placed on a platen glass of an image reading device;

a business card array image detection unit to detect the document image as a business card array image in which a plurality of business card images are arranged without gaps, based on at least one of a distribution of character string objects and a distribution of character sizes in the document image, when the document is a plurality of business cards arranged without gaps; and a business card image separating unit for separating the detected business card array image into the plurality of business card images, wherein the business card array image detecting unit does not detect the document image as the business card array image when the number of the character string objects whose character size is within a predetermined range is not within a predetermined range in one of a main scanning direction and a sub-scanning direction of the document image.

* * * * *